UNITED STATES PATENT OFFICE.

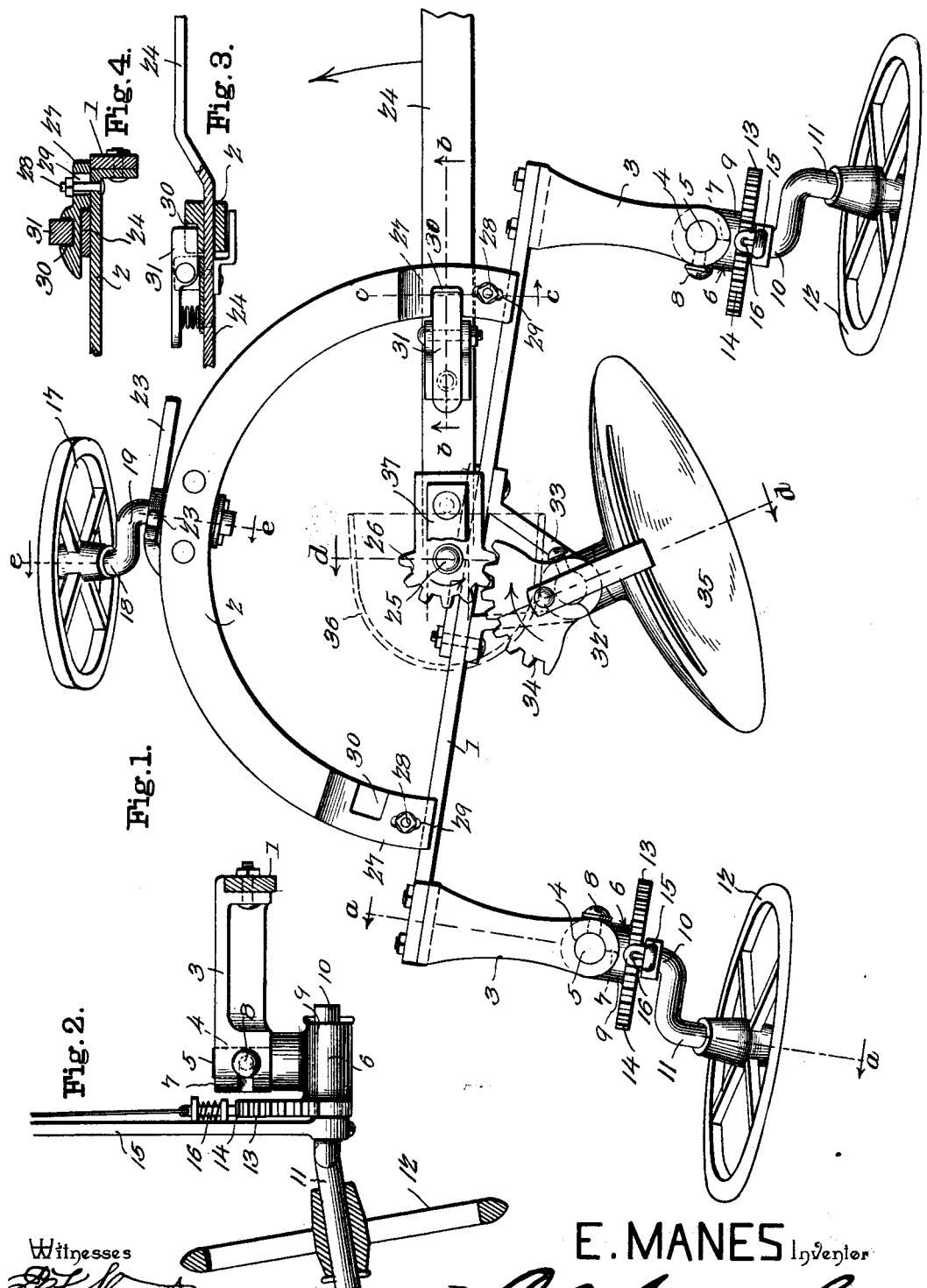

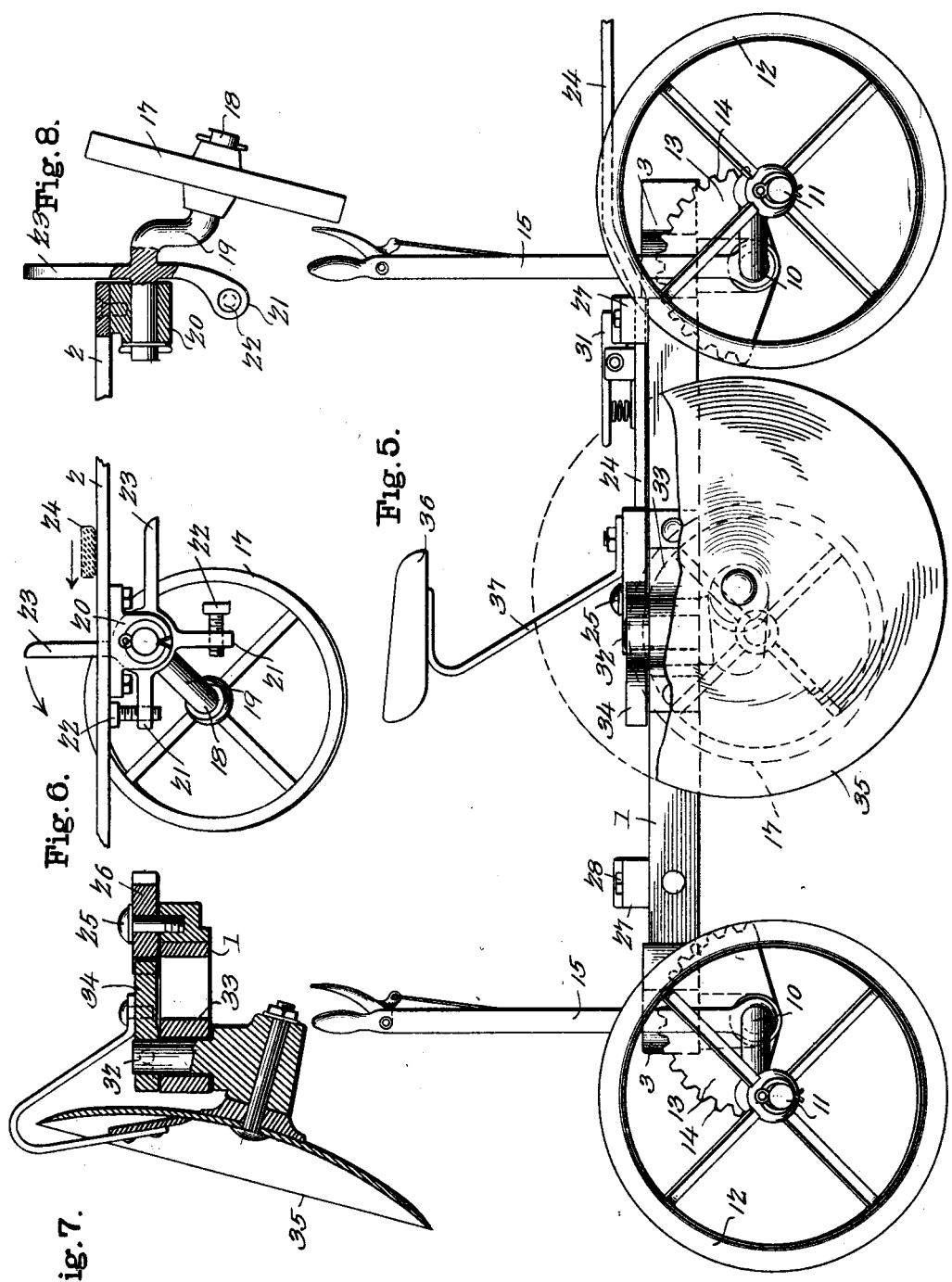

EPHRAIM MANES, OF CHATTANOOGA, TENNESSEE.

REVERSIBLE WHEELED PLOW.

SPECIFICATION forming part of Letters Patent No. 676,005, dated June 11, 1901.

Application filed January 26, 1901. Serial No. 44,907. (No model.)

*To all whom it may concern:*

Be it known that I, EPHRAIM MANES, a citizen of the United States, residing at Chattanooga, in the county of Hamilton and State of Tennessee, have invented a new and useful Reversible Wheeled Plow, of which the following is a specification.

My invention is an improved reversible wheeled plow adapted for plowing hillsides and also to be used on level ground and to throw the furrows in either direction required without the necessity of turning the plow at the end of a row.

My invention consists in the peculiar construction and combination of devices hereinafter fully set forth and claimed.

In the accompanying drawings, Figure 1 is a top plan view of a reversible wheeled plow constructed in accordance with my invention. Fig. 2 is a detail sectional view of the same, taken on a plane indicated by the line *a a* of Fig. 1. Fig. 3 is a similar view taken on a plane indicated by the line *b b* of Fig. 1. Fig. 4 is a similar view taken on a plane indicated by the line *c c* of Fig. 1. Fig. 5 is a side elevation of my improved reversible plow. Fig. 6 is a detail view of the same from the opposite side. Fig. 7 is a detail sectional view taken on a plane indicated by the line *d d* of Fig. 1. Fig. 8 is a similar view taken on the line *e e* of Fig. 1.

I will first describe the wheeled frame which carries the plow.

On one side of a bar 1, which is preferably straight and preferably made of metal, is a semicircular bar 2, the ends of which are downturned and bolted to the bar 1, as shown. Said semicircular bar 2 may, however, be secured to the bar 1 by any other suitable means. The ends of the bar 1 project beyond the ends of the semicircular bar 2, and said bar 1 is provided at its ends on the side opposite the curved bar 2 with brackets 3, which may be secured thereto by bolts, as here shown, or may be secured thereto by any other suitable means. In the outer ends of the brackets 3 are formed bearings 4 for the vertical spindles 5 at the upper ends of standards 6. The said standards are thus pivotally connected to the said brackets. Segmental slots 7 are made in the bearings 4, which slots extend to the spindles 5 of standards 6. Set-screws 8 in the said spindles operate in the said slots. Said set-screws when tightened prevent the standards from turning in their bearings and when loosened permit the standards to turn therein for the purpose hereinafter described. In each of the standards 6 at its lower end is formed a horizontal bearing 9, in which is journaled a cranked axle 10. The spindles 11 of said cranked axles are disposed at a suitable angle with relation thereto, and on the said spindles are journaled furrow-wheels 12. Secured to or formed with each of the bearings 9 is a segment-plate 13, provided with a segmental rack 14. Each of the axles 10 has a hand-lever 15 rigidly secured thereto, and each of the said hand-levers has a spring-pressed dog 16 of the usual construction, said dogs, segment-plates, and hand-levers serving to secure the pivoted axles 10 in the bearings 9 at any desired adjustment and adapting the side of the frame which is supported by the furrow-wheels to be raised and lowered, as will be understood.

A landside-wheel 17 is journaled on the spindle 18 of a cranked axle 19, which cranked axle is journaled in a bearing 20, that is secured to the under side of the semicircular bar 2 at a point midway between the ends of said semicircular bar, the said cranked axle 19 being thus disposed at right angles to the bar 1. The said cranked axle 19 is provided with a pair of radial arms 21, which are disposed at substantially right angles to each other. The cranked axle 19 is adapted to oscillate in its bearings, and the extent of its partial rotation is predetermined by adjustable stops 22, with which the arms 21 are provided, the said stops coacting with the curved bar 2, as shown in Fig. 6 and as will be readily understood. In the form of my invention here shown the stops 22 are set-screws; but any other suitable form of stops may be employed, if preferred. The said cranked axle 19 is further provided with a pair of tappet-arms 23, by means of which it may be oscillated in its bearings. The said tappet-arms are disposed on the side of the cranked axle opposite the stop-arms 21 and are at right angles to each other. The spindle 18 of cranked axle 19 is disposed at a suitable angle with relation thereto.

The beam 24 is reversible, its outer end being adapted to be swung to either end of the wheeled frame. The inner end of the said beam 24 is pivotally connected to the center of the bar 1, as at 25, and is provided with a segment-gear 26. Lock-blocks 27 are secured on the ends of the semicircular bar 2 by adjusting-bolts 28, which operate in slots 29, with which said lock-blocks are provided. Each of said lock-blocks is provided on its inner side with a recess 30. The beam 24 is provided with a spring-pressed dog 31, which by engagement with the recesses 30 of the lock-blocks secures the beam in position when swung to either end of the wheeled frame.

A vertically-disposed standard 32 is journaled in a bearing 33, which is secured at the center of the bar 1 and projects from the furrow side thereof. At the upper end of the said standard is a segment-gear 34, which engages the segment-gear 26, carried by the beam 24, and hence when the latter is reversed on the wheeled frame the said standard is swung or partly rotated in such manner as to reverse the plow or disk which is carried thereby. As herein shown, the standard 32 carries a disk 35. A suitable plow may, however, be employed in lieu of the disk, and I do not limit myself in this particular. A seat 36 for the driver is mounted on a seat-bar 37, which is bolted or otherwise suitably secured on the inner end of the beam.

In operation the furrow-wheel which is in rear of the disk or plow operates in the furrow made thereby and the furrow-wheel which is in advance of the disk or plow runs in the next adjacent furrow. The inclination of the spindles of the cranked axles 10, which carry the furrow-wheels, is such as to cause the furrow-wheels to counteract any tendency of the plow to move laterally while in operation.

The beam 24, when the same is reversed at the end of a row by engagement with one of the tappet-arms 23 with which the axle of the landside-wheel is provided, reverses the disposition of said axle and landside-wheel. The lock-blocks 27 being adjustable on the wheeled frame, the disk or plow may be adjusted obliquely to the line of draft at any desired angle, as will be understood.

The hand-levers 15 are used to turn the crank-axles which carry the furrow-wheels for the purpose of raising or lowering the plow or disk and setting the same to operate at any desired depth. When the machine is being turned or driven from one point to another and the plow is not in operation, the cranked axle of the rearmost furrow-wheel is permitted to swing in a horizontal plane to cause said wheel to track, this being accomplished by loosening the set-screw 8, and the standard 6, which carries the said cranked axle, being thereby permitted to turn in its bearing 4.

Having thus described my invention, I claim—

1. In a plow of the class described, the combination of a wheeled frame, a reversible beam, a pivoted standard to carry a plow and connections between said reversible beam and said standard to turn the latter when said beam is reversed, for the purpose set forth, substantially as described.

2. In a plow of the class described, the combination of a wheeled frame, a reversible beam, a pivoted standard to carry a plow, connections between said reversible beam and said standard to turn the latter when said beam is reversed, and adjustable stops for the said beam, for the purpose set forth, substantially as described.

3. In a plow of the class described, the combination of a frame, a reversible beam thereon, a plow reversed by said beam, furrow-wheels on one side of said frame, a landside-wheel on the other side thereof, an oscillating crank-axle for said landside-wheel, stops for said crank-axle, and tappet-arms projecting from said cranked axle, and engaged by said beam, when the latter is reversed to partly turn the said cranked axle, for the purpose set forth, substantially as described.

4. In a plow of the class described, the combination of a frame, a reversible beam thereon, a plow reversed by said beam, a landside-wheel on one side of said frame, furrow-wheels on the opposite side thereof, crank-axles for said furrow-wheels, bearings for said crank-axles and means to turn said crank-axles in said bearings and secure the same at any desired adjustment, for the purpose set forth, substantially as described.

5. In a plow of the class described, the combination of a frame, a reversible beam thereon, a plow reversed by said beam, a landside-wheel on one side of said frame, furrow-wheels on the opposite side thereof, crank-axles for said furrow-wheels, pivoted standards having bearings for said crank-axles, means to turn and adjust said crank-axles in said bearings and means to permit said standards to partly rotate, for the purpose set forth, substantially as described.

In testimony that I claim the foregoing as my own I have hereto affixed my signature in the presence of two witnesses.

EPHRAIM MANES.

Witnesses:
O. F. JAMES,
FREDERICK GATES.